(12) United States Patent
Hussain et al.

(10) Patent No.: US 8,272,275 B2
(45) Date of Patent: Sep. 25, 2012

(54) CORIOLIS MASS FLOWMETER WITH A MAGNET ASSEMBLY HAVING A NON-MAGNETIZABLE MAGNET HOLDER

(75) Inventors: Yousif Hussain, Weston Favell (GB); Chris Rolph, Hartwell (GB); Neil Harrison, Duston (GB)

(73) Assignee: Krohne AG, Basel (CH)

( * ) Notice: Subject to any disclaimer, the term of this patent is extended or adjusted under 35 U.S.C. 154(b) by 317 days.

(21) Appl. No.: 12/690,204

(22) Filed: Jan. 20, 2010

(65) Prior Publication Data
US 2011/0138930 A1 Jun. 16, 2011

(30) Foreign Application Priority Data

Dec. 11, 2009 (DE) .................. 10 2009 057 912

(51) Int. Cl.
*G01F 1/84* (2006.01)
(52) U.S. Cl. .................................. 73/861.355
(58) Field of Classification Search ............. None
See application file for complete search history.

(56) References Cited

U.S. PATENT DOCUMENTS

| 4,655,089 | A | * | 4/1987 | Kappelt et al. | 73/861.356 |
| 4,738,144 | A | * | 4/1988 | Cage | 73/861.355 |
| 4,876,898 | A | * | 10/1989 | Cage et al. | 73/861.355 |
| 4,949,583 | A | * | 8/1990 | Lang et al. | 73/861.357 |
| 5,218,873 | A | * | 6/1993 | Lang | 73/861.357 |
| 5,602,345 | A | | 2/1997 | Wenger et al. | |
| 5,987,998 | A | | 11/1999 | Campbell et al. | |
| 6,805,012 | B2 | | 10/2004 | Loving et al. | |
| 7,665,369 | B2 | | 2/2010 | Bitto et al. | |
| 7,971,494 | B2 | | 7/2011 | Hussain et al. | |
| 2008/0202257 | A1 | | 8/2008 | Gunturi et al. | |
| 2009/0173169 | A1 | * | 7/2009 | Bitto et al. | 73/861.355 |
| 2009/0266177 | A1 | | 10/2009 | Hussain et al. | |
| 2010/0132480 | A1 | * | 6/2010 | Bitto et al. | 73/861.357 |
| 2011/0209561 | A1 | | 9/2011 | Hussain et al. | |

FOREIGN PATENT DOCUMENTS

| DE | 10 2008 007742 A1 | 11/2008 |
| EP | 1985975 A2 * | 10/2008 |
| JP | 59006759 A * | 1/1984 |
| WO | 2007/043996 A1 | 4/2007 |

* cited by examiner

*Primary Examiner* — Harshad R Patel
(74) *Attorney, Agent, or Firm* — Roberts Mlotkowski Safran & Cole, P.C.; David S. Safran

(57) ABSTRACT

A Coriolis mass flowmeter having a measuring tube that can be excited to oscillation and a magnet assembly (1) serving to generate oscillations and/or to receive oscillations. The magnet assembly (1) includes at least one permanent magnet (2) and a magnet holder (3) holding the permanent magnet (2). The Coriolis mass flowmeter that has a mounting for the permanent magnet, which can withstand long-term oscillation stress and can reliably protect the permanent magnet is implemented by the magnet holder (3) consisting of nonmagnetic metal such as stainless steel.

13 Claims, 3 Drawing Sheets

CORIOLIS MASS FLOWMETER WITH A MAGNET ASSEMBLY HAVING A NON-MAGNETIZABLE MAGNET HOLDER

BACKGROUND OF THE INVENTION

1. Field of Invention

The invention relates to a Coriolis mass flowmeter having a measuring tube that can be excited to oscillation and a magnet assembly serving to generate oscillations and/or to measure oscillations, wherein the magnet assembly comprises at least one permanent magnet and a magnet holder holding the permanent magnet.

2. Description of Related Art

Mass flowmeters that work according to the Coriolis principle have at least one oscillation generator, with which the measuring tube is excited to oscillation. The oscillation of the measuring tube is normally detected with two oscillation sensors. The determination of the mass flowmeter then occurs via the phase shift between the oscillations detected respectively by both oscillation sensors.

The oscillation generator and the oscillation sensor are constructed so that they have a permanent magnet as well as a magnetic coil in order to transfer oscillations electrically onto the measuring tube or to detect oscillations of the measuring tube, which is why it is presently termed magnet assembly. In order to mount the permanent magnet on the oscillation generator or the oscillation sensor, it is, for example, glued into a protective housing surrounding the permanent magnet so that it is protected against damage due to external influences such as impact during transportation or during installation.

German Patent Application DE 10 2008 007 742 A1 discloses a Coriolis mass flowmeter that includes a magnet holder having a protective housing, wherein the magnetic holder is made of plastic. The permanent magnet is placed in the magnet holder and is held by it. The protective housing surrounds the magnet holder and protects the magnet additionally against mechanical damage. The protective units known from the prior art, however, have the disadvantage that due to long-term oscillation stress, the mounting between the plastic magnet holder and the metallic protective housing has to be produced with a comparatively large amount of work.

SUMMARY OF THE INVENTION

Based on the previously mentioned prior art, a primary object of the present invention is to provide a Coriolis mass flowmeter that has a mounting for the permanent magnet, which can withstand a long-term oscillation stress and can reliably protect the permanent magnet.

Based on the Coriolis mass flowmeter described in the introduction, the object indicated above is met in that the magnet holder of the magnet assembly is made of a nonmagnetic metal, such as stainless steel. The magnet holder of nonmagnetic metal is not susceptible to damage due to long-term oscillation, so that the magnet holder, for example, has an increased service life as compared to a magnet holder made of plastic. Additionally, the Coriolis mass flowmeter according to the invention has the advantage that it can also be used for high-temperature applications due to construction of the magnet holder of nonmagnetic metal, without parts of the measuring device being damaged by high temperatures. The magnet holder is made of nonmagnetic or non-magnetizable metal, preferably stainless steel, so that the magnet holder does not influence the magnetic field of the permanent magnet. Preferably, the magnet holder completely surrounds and protects the magnet so that it is protected against mechanical damage, for example, by means of impact.

In order to additionally protect the permanent magnet against damage, it is provided according to a preferred design that the magnet assembly has a protective housing, wherein the magnet holder is firmly bonded with the protective housing, in particular, the protective housing is made of carbon steel. The magnet holder and the protective housing are preferably coaxially arranged, wherein the magnet holder is, for example, soldered or welded onto the protective housing. Resistance welding, inter alia, in particular, resistance spot welding or also other methods of welding are suitable as the welding method. Soft-soldering, hard-soldering or high temperature soldering is, for example, suitable as the soldering method. The protective housing and the magnet holder are reliably firmly bonded in this way, so that the bond is permanent. The bond is not damaged by long-term oscillations or by high temperatures.

The material of the protective housing should have an overall high magnetic permeability so that the protective housing can control the magnetic flux lines, which emanate from the permanent magnet, in particular to secure a high flux density near the coil. Normal steel or construction steel having a low carbon content are suitable materials. In order to guarantee corrosion resistance of the protective housing, it is provided that the protective housing is made of carbon steel. Alternatively, it can be made of stainless steel, wherein this should be magnetizable stainless steel.

So that the magnet holder can nearly completely surround the permanent magnet, it is provided by a preferred design that the magnet holder forms a receiving space for the permanent magnet and the permanent magnet is inserted in the receiving space of the magnet holder. Thus, the permanent magnet is surrounded by the rigid walls of the magnet holder so that the danger of mechanical damage of the permanent magnet is reduced. The receiving space surrounds the permanent magnet, here, preferably in such a manner that there is no or very little space remains between the walls of the receiving space and the permanent magnet.

It is highly preferred that this space can be reduced by designing the magnet holder as a hollow cylinder and defining the receiving space for the permanent magnet. Preferably, the permanent magnet is also cylindrically designed for this, wherein the outer diameter of the permanent magnet essentially corresponds to the inner diameter of the hollow cylinder so that the cylindrical permanent magnet can be inserted in the magnet holder shaped as a hollow cylinder and can be mounted within the magnet holder. The magnet holder is preferably surrounded by a cylindrical protective housing; here, the protective housing and the magnet holder are coaxially arranged. The magnet holder arranged in the protective housing is preferably somewhat longer than the length of the protective housing—meaning the respective length of the cylinder—so that the magnet holder extends beyond the protective housing, preferably by about one to two millimeters.

So that the permanent magnet is reliably mounted within the magnet holder, it is provided by an advantageous design that the permanent magnet is held in the magnet holder by plastically molding an open end of the magnet holder. An open end of the magnet holder—preferably the end through which the magnet was inserted into the magnet holder—is plastically molded or crimped together here with a tool so that the opening of the magnet holder is reduced in such a manner that the magnet can no longer pass through. Preferably, the length of the magnet holder is somewhat longer than the permanent magnet itself so that the extending part of the magnet holder is pressed together. It should be taken into consideration here, that the magnet is not damaged by the plastic molding and that the magnet holder essentially keeps its outer shape and is only very locally plastically molded.

According to a preferred design of the Coriolis mass flowmeter, it is provided that the magnet holder has a base plate, wherein the magnet holder having the base plate is mounted to the protective housing. The base plate is preferably circular, wherein the part of the magnet holder forming the receiving space of the magnet holder—for example a cylindrical tube—is mounted on the base plate. A circular base plate is particularly suitable for a protective housing having a circular floor. The base plate serves to mount the magnet holder on the protective housing and is preferably of the same material as the magnet holder. In order to mount the magnet holder onto the protective housing, the magnet holder is, for example, welded or soldered with its base plate to the protective housing.

In order to reliably align the magnet holder and the protective housing to one another, it is advantageously provided that the protective housing has a positioning means in the contact area with the magnet holder so that the magnet holder can be aligned on the positioning means in the protective housing. The positioning means is preferably designed as a projection or recess on the protective housing, wherein the magnet holder has a corresponding counterpart so that a simple aligning of the magnet holder relative to the protective housing is made possible. Preferably, the magnet holder and also the protective housing are cylindrical so that they can also be coaxially aligned with the positioning means.

According to a preferred development, it is provided that the positioning means is designed as a projection on the protective housing, in particular, the projection is circular and has a diameter corresponding to the inner diameter of the receiving space of the magnet holder. Thus, the magnet holder can be placed on the projection in simple manner. In designs having a base plate, the base plate has a recess in the area of the projection so that the projection can grip into or through the base plate. The magnet holder is not only aligned relative to the protective housing the projection, but is additionally also held in a form-locking manner by the projection. Preferably, the surface of the projection is produced with a special surface quality so that the permanent magnet can be place on a particularly smooth surface.

In order to mount the protective housing with the magnet holder mounted on it to the Coriolis mass flowmeter in a simple manner, it is provided by a preferred design that the protective housing has a mounting means for mounting on a supporting unit. The protective housing has, for example, a cylindrical rod on its back for this, with which mounting on a supporting frame is made possible. The cylindrical rod is preferably integrally formed with the protective housing and has, for example, threading or is completely smooth.

A design, which is then particularly suitable when the magnet holder is soldered with the protective housing, is characterized in that the protective housing has at least one hole in the contact area with the magnet holder. A filler material or flux can, for example, be introduced from the bottom on the magnet holder through this hole so that a reliable bond is ensured between the magnet holder and the protective housing. The base plate—insofar as there is one—can be reached from the back of the protective housing through the hole in the contact area.

Besides, or in addition to, the mounting of the permanent magnet using a plastic molding of a part of the magnet holder, it is provided by an advantageous development that the permanent magnet is mounted to the magnet holder at least by means of an adhesive. In addition, another adhesive is added to the receiving space of the magnet holder when the permanent magnet is inserted so that the magnet is kept free of play by the adhesive within the receiving space of the magnet holder. The adhesive fills the marginal space between the magnet holder and the permanent magnet, whereby damage to the permanent magnet is nearly eliminated.

According to a final design of the Coriolis mass flowmeter, it is provided that the magnet assembly includes at least two permanent magnets and at least one metal core, wherein the metal core is arranged in the magnet holder between the permanent magnets, in particular the permanent magnets, here, are aligned to one another respectively with a same pole. The, for example, cylindrical permanent magnets are inserted in the cylindrical magnet holder consecutively, wherein a cylindrical metal core is inserted between the permanent magnets. The metal core preferably has a high magnetic permeability, which, for example, is comparable to the permeability of the protective housing, which is—for example—made of carbon steel. The permanent magnets, which are arranged in front of or behind the metal core, are preferably aligned so that they are aligned to one another respectively with a same pole, wherein this means that, for example, respectively both south poles of the magnets flank the metal core, whereby this results in an advantageous course of the magnetic field. Alternatively, the magnets can also be aligned so that both north poles respectively flank respectively one side of the metal core.

In detail, there is a plurality of possibilities to design and further develop the Coriolis mass flowmeter according to the invention as will be apparent from the following detailed description in connection with the accompanying drawings.

DETAILED DESCRIPTION OF THE INVENTION

Figure 1:
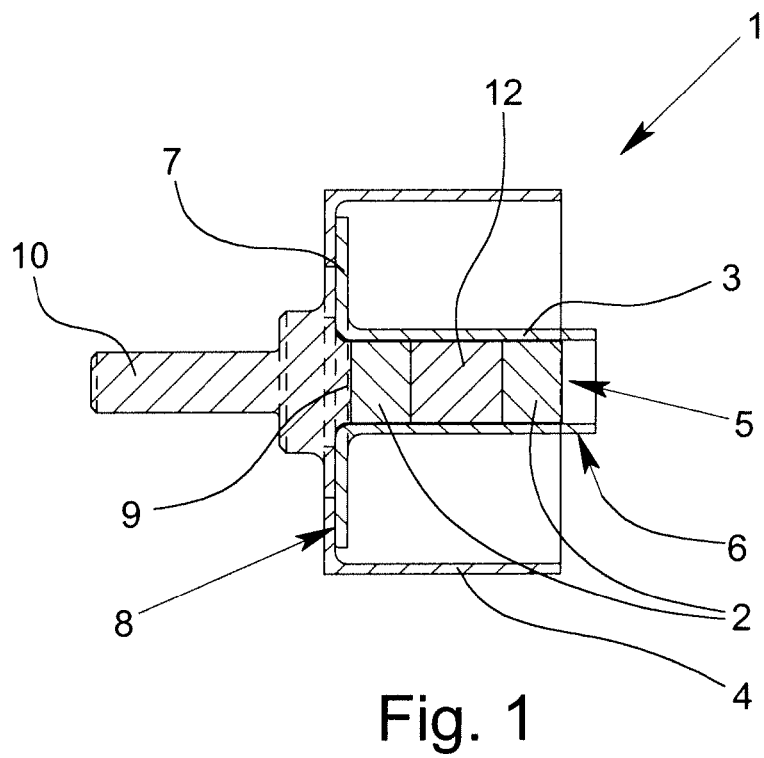
FIG. 1 is a sectional side view of an embodiment of a magnet holder having a protective housing for a Coriolis mass flowmeter according to the invention.

FIG. 1 shows a magnet assemble 1 for a Coriolis mass flowmeter having a measuring tube that can be excited to oscillation, wherein the magnet assembly 1 serves to generate oscillations and/or to receive oscillations. The magnet assembly 1 in the embodiment according to FIGS. 1 to 3 includes two permanent magnets 2, which are mounted in a magnet holder 3, which is made of a nonmagnetic metal, such as stainless steel. The magnet holder 3 is surrounded by a protective housing 4, wherein the protective housing 4 is firmly bonded with the magnet holder 3. In this embodiment, the magnet holder 3 is soldered with the protective housing 4 and the protective housing is made of carbon steel.

The magnet holder 3 is designed as a hollow cylinder and forms a cylindrical receiving space 5, in which the cylindrical permanent magnets 2 are inserted. The permanent magnets 2 are inserted through the open end 6 of the magnet holder 3 into the receiving space 5, wherein the open end 6—as shown, in particular, in FIG. 3—is plastically molded. The magnet holder 3 has a base plate 7 according to FIG. 1, wherein the magnet holder 3 with the base plate 7 is firmly bonded with the protective housing 4 in a contact area 8—here, the floor of the protective housing 4. In order to position the magnet holder 3 within the protective housing 4, the protective housing 4 has a positioning means 9 designed as a projection, wherein the magnet holder 3 can be positioned and aligned with the protective housing 4 with the positioning means 9. the diameter of the, here circular, positioning means 4 corresponds essentially to the inner diameter of the receiving space 5, wherein the base plate 7 has a recess so that the positioning means 9 can grip into the base plate 7.

Figure 2:
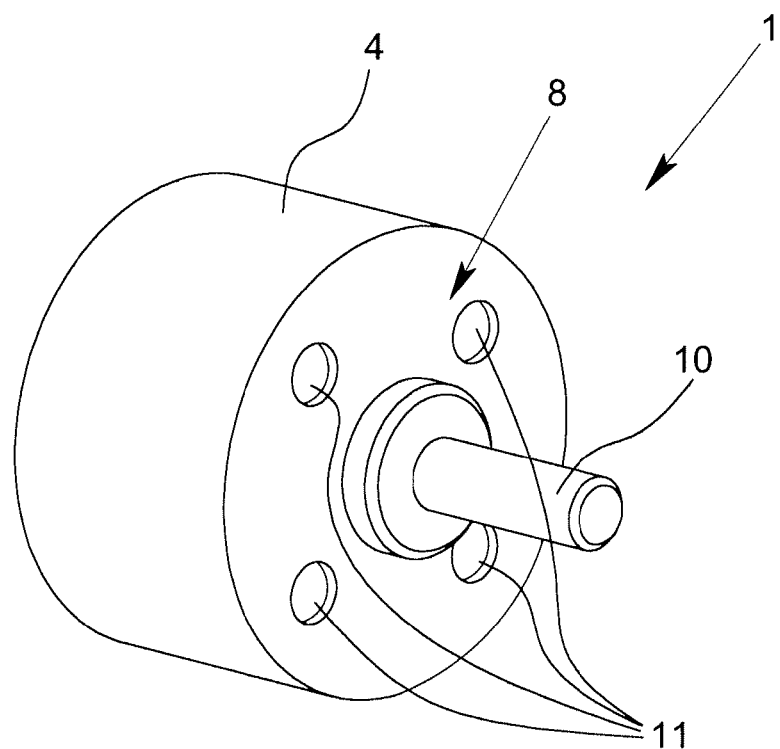
FIG. 2 is a perspective rear view of the embodiment of the magnet holder having a protective housing according to FIG. 1.

FIG. 2 shows a perspective rear view of the magnet assembly 1, wherein a mounting means 10 for mounting the magnet assembly 1 onto a Coriolis mass flowmeter is provided in the back section of the protective housing 4. The mounting means 10 is also cylindrical and integrally formed with the protective housing. In addition to the mounting means 10, a plurality of holes 11 are provided in the back section of the protective housing 4, which are arranged in the contact area 8 of the protective housing 4. The base plate 7 of the magnet holder 3 can be reached from its lower side through the holes 11, so that a flux or a filler material can be introduced through the holes 11 on the lower side of the base plate 7 of the magnet holder 3 in order to mount the magnet holder 3 onto the protective housing 4.

According to FIG. 1, aside from the permanent magnets 2, an additional metal core 12 is inserted between both permanent magnets 2 within the receiving space 5 of the magnet holder 3, which separates the permanent magnets 2 from one another and serves for a special alignment of the magnetic field of the permanent magnets 2. The permanent magnets 2 are arranged here so that they each flank the metal core 12 with their south poles. The permanent magnet 2 shown on the left side in FIG. 1 lies against the projection 9 of the protective housing 4.

Figure 3:
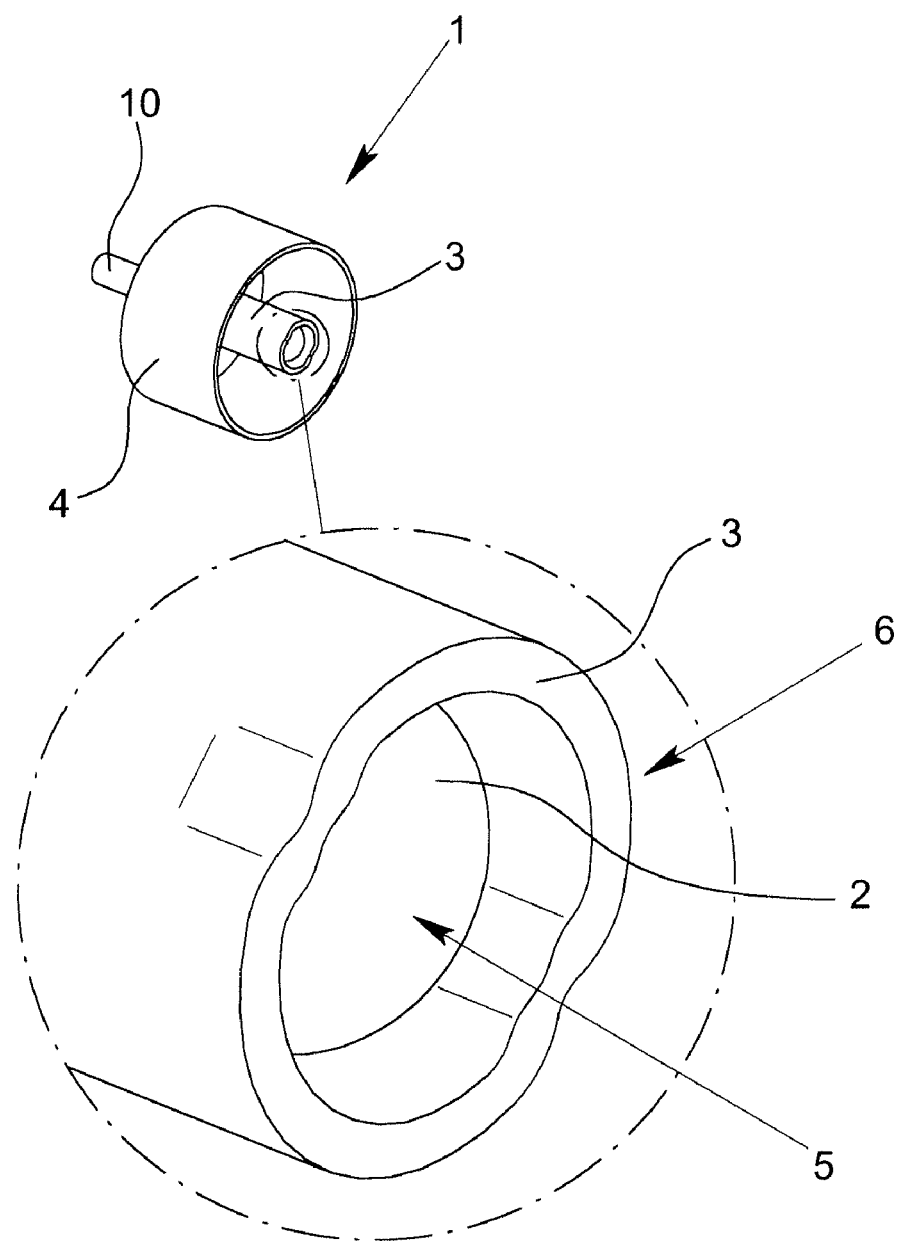
FIG. 3 shows the embodiment of the magnet holding having a protective housing according to FIGS. 1 and 2 with an enlarged exploded view of the plastically molded magnet holder.

FIG. 3 shows a magnet assembly 1, in particular, an exploded view of the plastically molded open end 6 of the magnet holder 3, wherein the open end 6 of the magnet holder 3 is plastically molded or crimped together at two opposing positions, so that the opening to the receiving space 5 is made smaller and the magnets 2 can no longer be moved out of the receiving space 5.

Figure 4:
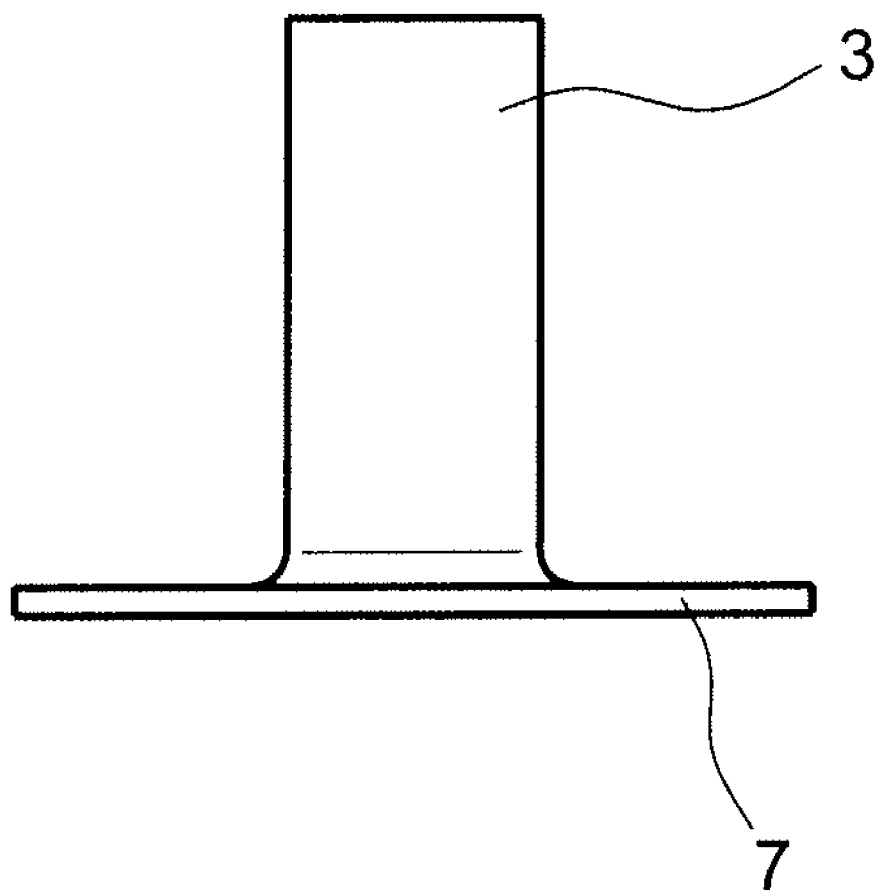
FIG. 4 is a side view of an embodiment of a magnet holder.

FIG. 4 shows a magnet holder 3 of nonmagnetic stainless steel, wherein the magnet holder 3 is integrally formed with a base plate 7. The magnet holder 3 can be mounted with the base plate 7 onto a protective housing 4. The height of the cylindrical part of the magnet holder 3 is slightly larger than the height of the protective housing 4—see FIG. 1—so that the magnet holder 3 extends somewhat beyond the outer height of the protective housing 4 with its open end 6. This extending part on the open end 6 of the magnet holder 3 serves to plastically mold the permanent magnets 2 within the magnet holder 3 for mounting. The permanent magnets 2 for a cylinder together with the metal core 12, which ends flush at the outer edge of the protective housing 4 in respect to its height.

What is claimed is:

1. Coriolis mass flowmeter comprising:
   at least one measuring tube that can be excited to oscillation and
   a magnet assembly that generates and/or measures oscillations, the magnet assembly having at least one permanent magnet and a magnet holder holding the permanent magnet,
   wherein the magnet holder is made of a non-magnetizable metal,
   wherein the magnet assembly has a protective housing, wherein the magnet holder is firmly bonded within the protective housing, and wherein the magnet holder forms a receiving space for the permanent magnet and the at least one permanent magnet is located in the receiving space of the magnet holder.

2. Coriolis mass flowmeter according to claim 1, wherein the non-magnetizable metal is stainless steel.

3. Coriolis mass flowmeter according to claim 1, wherein that magnet holder has a base plate, and wherein the base plate of the magnet holder is mounted to the protective housing.

4. Coriolis mass flowmeter according to claim 1, wherein the protective housing has a positioning means in an area contacted by the magnet holder for aligning the magnet holder on the positioning means in the protective housing.

5. Coriolis mass flowmeter according to claim 4, wherein the positioning means is formed by a projection on the protective housing and has a diameter corresponding to an inner diameter of a tube part of the magnet holder.

6. Coriolis mass flowmeter according to claim 1, wherein the protective housing has a mounting means for mounting thereof onto a supporting unit.

7. Coriolis mass flowmeter according to claim 1, wherein the protective housing has at least one hole in the area contacted by the magnet holder.

8. Coriolis mass flowmeter according to claim 1, wherein the protective housing is made of carbon steel.

9. Coriolis mass flowmeter according to claim 1, wherein the magnet holder is a hollow cylinder.

10. Coriolis mass flowmeter according to claim 1, wherein the permanent magnet is held in the magnet holder due to an open end of the magnet holder having been plastically molded.

11. Coriolis mass flowmeter according to any to claim 1, wherein the at least one permanent magnet is mounted to the magnet holder by means of at least one adhesive.

12. Coriolis mass flowmeter according to claim 1, wherein the magnet assembly includes at least two permanent magnets and at least one metal core, wherein the metal core is arranged in the magnet holder between the permanent magnets.

13. Coriolis mass flowmeter according to claim 12, wherein the at least two permanent magnets are aligned relative to one another with the same pole, and wherein the metal core is made of carbon steel.

* * * * *